United States Patent [19]
Maeda

[11] Patent Number: 6,094,271
[45] Date of Patent: Jul. 25, 2000

[54] WAVELENGTH MEASURING SYSTEM

[75] Inventor: Minoru Maeda, Tokyo, Japan

[73] Assignee: Ando Electric Co., Ltd., Tokyo, Japan

[21] Appl. No.: 09/237,619

[22] Filed: Jan. 26, 1999

[30] Foreign Application Priority Data

Jan. 29, 1998 [JP] Japan ................................ 10-017346

[51] Int. Cl.$^7$ ................................................ G01B 11/00
[52] U.S. Cl. .......................................... 356/394; 356/328
[58] Field of Search .................................. 356/326, 328, 356/330–334, 394; 250/339.07

[56] References Cited

U.S. PATENT DOCUMENTS

5,275,168 1/1994 Reintjes et al. .
5,796,479 8/1998 Derickson et al. .

*Primary Examiner*—Robert H. Kim
*Assistant Examiner*—Tu T. Nguyen
*Attorney, Agent, or Firm*—Flynn, Thiel, Boutell & Tanis, P.C.

[57] ABSTRACT

A wavelength measuring system includes a lens for converting an outgoing light beam from an input fiber into parallel light rays, a first wavelength dispersion element disposed on the optical axis of the parallel light rays for spectral diffraction of the parallel light rays and a second wavelength dispersion element disposed opposite to the first wavelength dispersion element so as to allow the parallel light rays, after spectral diffraction by the first wavelength dispersion element, to fall thereon. A right-angle reflecting prism divides the parallel light rays from the second wavelength dispersion element into two reflected light beams. First and second optical receivers receive the reflected light beams from the right-angle reflecting prism, respectively, and a signal processing circuit processes signals from the first and second optical receivers, respectively, thereby determining the wavelength of an incoming light beam for measurement. Thus, the wavelength measuring system is compact in size and low in cost. The wavelength measuring system has no movable mechanical parts, and does not require software for data processing when measuring the wavelength of a light wave oscillating in a single mode and in a wide wavelength range at a light source.

20 Claims, 11 Drawing Sheets

WAVELENGTH MEASURING SYSTEM

BACKGROUND OF THE INVENTION

1. Field of the Invention

The invention relates to a wavelength measuring system for measuring the wavelength of a light wave oscillated, for example, in a single mode.

2. Description of the Related Art

In the case of a DFB—LD (Distributed Feedback—Laser Diode) light source and a DBR—LD (Distributed Bragg Reflector—Laser Diode) light source, for oscillating a light wave in a single mode, drift in the wavelength of the light wave occurring over the long term has recently become a matter for concern. Accordingly, with a high density WDM (wavelength division multiplex) system, it has become necessary to make measurement of the wavelength of a light wave oscillated by a light source from time to time as necessary for control of the wavelength.

Meanwhile, an external optical cavity type wavelength tunable light source with the use of a diffraction grating has recently been put to practical use, and is now in widespread use for measuring the wavelength characteristics of optical components, and so forth. The external optical cavity type wavelength tunable light source has an advantage in that a wavelength can be set optionally in the wavelength band not shorter than 100 nm, however, on the other hand, it has a problem of susceptivity to external influence, in particular, the laser wavelength of a light wave emitted therefrom undergoing changes due to variation in temperature. In addition, following demands for higher precision with the high density WDM system, the tunable light source is required to have higher precision in the laser wavelength thereof.

Accordingly, there has arisen need of a wavelength measuring system for measuring the wavelength of a light wave oscillated, for example, in a single mode to determine a laser wavelength at a light source. Among conventional instruments for determining a laser wavelength at a light source, there are a spectrometer using a diffraction grating, a light wavelength measuring system utilizing the Michelson interferometer, and so forth.

Figure 10:
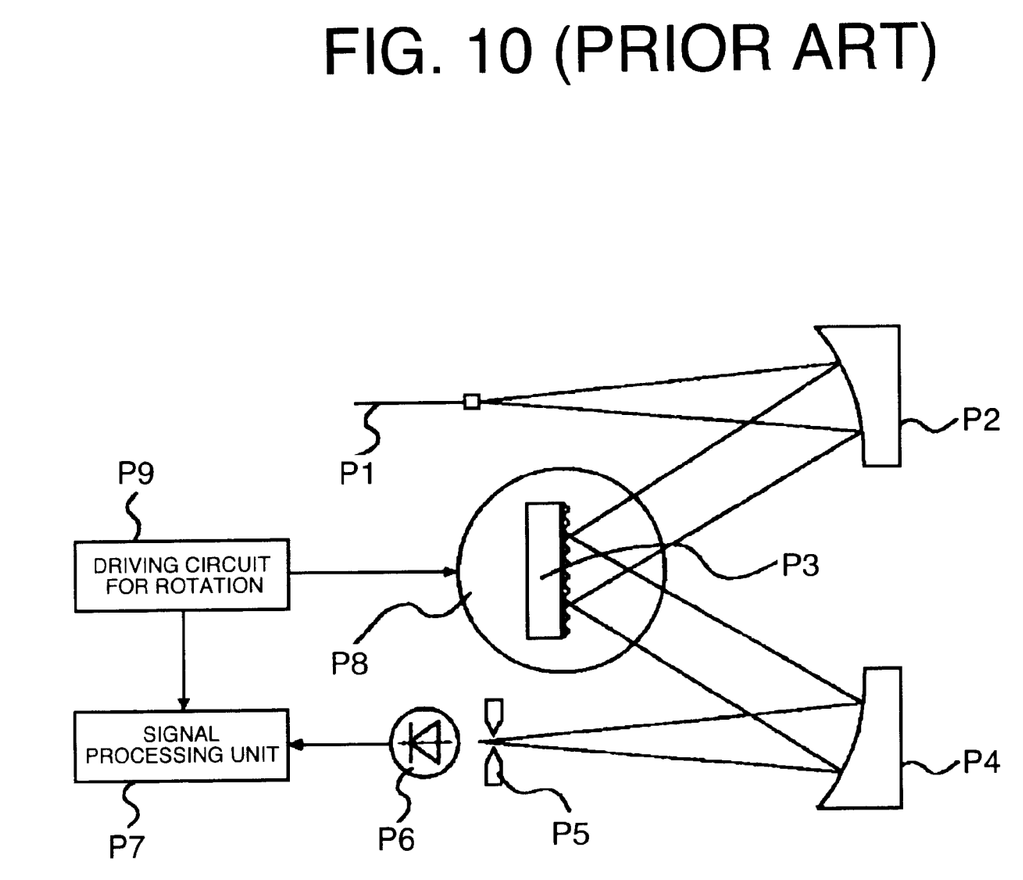
FIG. 10 is a block diagram showing a conventional spectrometer with a rotatable diffraction grating.

FIG. 10 is a block diagram showing a rotational type spectrometer, typical of conventional and common spectrometers, using a diffraction grating.

The rotational type spectrometer comprises an input fiber P1 as a light input part, concave mirrors P2, P4, a diffraction grating P3, a slit P5, an optical receiver P6, a signal processor P7, a rotational mechanism P8, a driving circuit for rotation P9, and so forth. A light beam for measurement, radiated from a light source (not shown), is allowed to fall on the rotational type spectrometer via the input fiber P1, and the intensity of the light beam passing through the slit P5 is detected while signals received indicating changes in the intensity of the light beam, caused by rotating the diffraction grating P3, are analyzed, thereby determining the wavelength of the light beam for measurement.

More specifically, the light beam for measurement, radiated from the light source (not shown), falls on the rotational spectrometer through the input fiber P1, and the concave mirror P2 turns the light beam outgoing from the input fiber P1 to parallel light rays and reflects same toward the diffraction grating P3.

The diffraction grating P3 is fixedly attached to the rotational mechanism P8, rotatable by signals outputted from the driving circuit for rotation P9, such that an inclination thereof can be adjusted.

The diffraction grating P3 is an optical element whereby a light ray at a wavelength selected by the angle of incidence q of an incoming light beam is reflected at the angle of reflection b according to the following equation (1);

$$\lambda = d/m \cdot (\sin \Theta + \sin \beta) \quad (1)$$

where l is the wavelength of the incoming light beam, d the distance between grating lines of the diffraction grating P3, m the order of diffraction at the diffraction grating P3, q the angle of incidence of the incoming light beam falling on the diffraction grating P3, and b the angle of reflection of the light ray reflected from the diffraction grating P3.

Accordingly, the parallel light rays incident on the diffraction grating P3 are caused to reflect a component thereof, at a wavelength determined by the angle of incidence q and the angle of reflection b as represented by the equation (1) above toward the concave mirror P4. The concave mirror P4 causes light rays after spectral diffraction by the diffraction grating P3 to be condensed at the optical receiver P6, and the optical receiver P6, in turn, outputs an electric signal corresponding to the intensity of condensed light rays at the wavelength, received thereby, to the signal processor P7.

The signal processor P7 finds the wavelength of the light beam for measurement on the basis of an optical signal from the optical receiver P6, at the wavelength selected by the diffraction grating P3, and a wavelength signal from the driving circuit for rotation P9.

With the wavelength measuring system utilizing the Michelson interferometer, another of the conventional wavelength measuring systems, the wavelength of the light beam for measurement is found through Fourier transform of an interference waveform obtained by the Michelson interferometer.

Another spectrometer using a diffraction grating and an optical receiver array (PD: photodiode array or CCD: charge couple device) has recently been developed.

Figure 11:
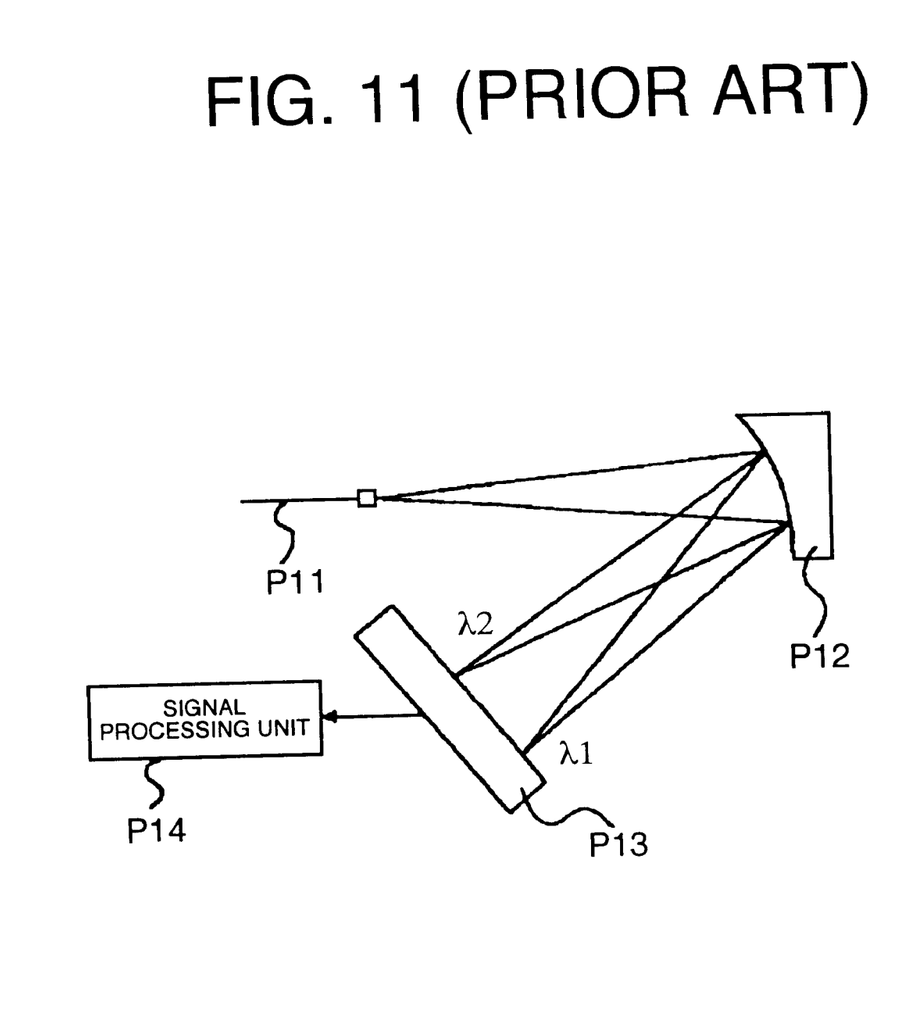
FIG. 11 is a block gram showing a conventional spectrometer using a fixed diffraction grating and a PD array.

FIG. 11 is a block diagram showing a spectrometer using a diffraction grating p12 and a PD array P13.

The spectrometer comprises an input fiber P11 as a light input part, a concave diffraction grating P12, a PD array P13, a signal processor P14, and so forth. A light beam for measurement, radiated from a light source (not shown), is allowed to fall on the concave diffraction grating P12 via the input fiber P11, and after spectral diffraction, received by the PD array P13, thereby determining the wavelength of the light beam for measurement.

More specifically, the lightbeam for measurement, radiated from the light source (not shown), falls on the spectrometer through the input fiber P11, and the light beam outgoing from the input fiber P11 falls on the concave diffraction grating P12. The concave diffraction grating P12 is fixedly attached to an optical bench (not shown) so as to form the angle of incidence q against the optical axis of incoming light rays, and not rotatable.

The incoming light rays incident on the concave diffraction grating P12 are condensed at the PD array P13, but the position of light condensation varies depending on the wavelength of the respective incoming light rays. Condensed light rays at various wavelengths, received by respective optical receiver elements in the PD array P13, are converted into electric signals corresponding to the intensity of the respective condensed light rays by the respective optical receiver elements, and the electric signals are outputted to the signal processor P14. The wavelength of the light beam for measurement is found on the basis of optical signals at respective wavelengths from the PD array P13 by operation of the signal processor P14.

On one hand, the conventional spectrometer using a diffraction grating, and the wavelength measuring system utilizing the Michelson interferometer have an advantage in that wavelengths in a wide wavelength range can be measured. On the other hand, however, these have a problem of lower reliability over the long term because they comprise movable mechanical components. Further, with these instruments, an optical system needs to be enlarged to enhance a wavelength resolving power, and consequently, it is difficult to reduce a size of an instrument in whole.

Meanwhile, the conventional spectrometer using a PD array has an advantage in that its reliability is enhanced as it has no movable mechanical component, and miniaturization in the construction thereof is feasible. However, it has problems that there is a limit to the extent to which cost can be reduced because of high cost of the PD array, its measurement resolving power is low because of a limited number of elements incorporated in the PD array, and so forth.

With any of the conventional wavelength measuring systems described hereinbefore, measured data need to be processed by use of a software to find a wavelength, requiring a data processor. Accordingly, in the case where these wavelength measuring systems are used for controlling a laser wavelength at a light source, the data need to be processed with a software, making them unsuitable for high-speed control of the wavelength.

Meanwhile, a wavelength measuring system called the wavelength locker, used for control of a laser wavelength at a light source, has since been developed. This wavelength measuring system has a construction wherein wavelengths are measured by a filter taking advantage of dielectric multiple layers or a spectroscopic device such as a diffraction grating.

With this type of the wavelength measuring system, however, the range of measurable wavelengths will be limited by the characteristic of a spectroscopic device (filter, and the like) in use, creating a problem that same can not be used in measuring wavelengths in a wide wavelength range. In addition, there is need for providing for spectroscopic devices dedicated for respective wavelengths, limiting the extent to which cost can be reduced.

That is, the wavelength measuring system called the wavelength locker is suitable for controlling laser wavelengths at a light source having a narrow tunable range such as the DBF—LD light source because same has high reliability without movable mechanical components, is suited for miniaturization in the construction thereof, and requires no software in processing of data. However, such a wavelength measuring system has a drawback in that it can not be used for measuring or controlling wavelengths at a light source such as the external optical cavity type tunable light source capable of varying wavelengths to 100 nm or longer.

SUMMARY OF THE INVENTION

It is therefore an object of the invention to provide a wavelength measuring system, not requiring movable mechanical parts in the main construction thereof when measuring the wavelength of a light wave, not requiring software in data processing when determining the wavelength, and capable of widening a range of measurable wavelengths.

To that end, a wavelength measuring system according to a first aspect of the invention comprises optics for converting an incoming light beam from a light input part into parallel light rays, spectroscopic means for receiving the parallel light rays from the optics, sending out the parallel light rays in a first direction as predetermined, and causing the parallel light rays sent out to undergo parallel displacement in a second direction containing vertical components of the first direction according to wavelengths of the parallel light rays, first splitting means for splitting the parallel light rays sent out from the spectroscopic means into two portions along a predetermined dividing line formed so as to contain the vertical components of the first direction and vertical components of the second direction; and signal processing means for outputting a signal for determining the wavelength of the incoming light beam on the basis of results of comparison in optical power between a first split light beam and a second split light beam, as divided by the first splitting means.

With the wavelength measuring system according to the first aspect of the invention, if there is shift in the wavelength of the incoming light beam, the parallel light rays sent out from the spectroscopic means undergoes parallel displacement toward the second direction, and magnitude of such displacement is represented by a ratio of optical power of the first split light beam to that of the second split light beam, as divided by the first splitting means. Accordingly, wavelengths can be determined on the basis of such comparison of the optical power, enabling measurement of the wavelength of the incoming light beam by a signal outputted by the signal processing means.

With the wavelength measuring system having such a construction wherein movable components of the conventional mechanism are not required in measuring wavelengths unlike the case of conventional wavelength measuring systems, degradation in reliability over the long term with respect to wavelength measurement (due to deterioration of the mechanism with movable components) is avoided, and further, the construction having no movable components can be made compact in size. In addition, since shift in the wavelength of the incoming light beam is represented by parallel displacement of the parallel light rays sent out from the spectroscopic means, and wavelength measurement is executed by use of the first split light beam and the second split light beam, sent out by dividing the parallel light rays into two portions along the dividing line of the first splitting means, the width of the parallel light rays sent out from the spectroscopic means represents the range of measurable wavelengths. It follows that the range of measurable wavelengths can be expanded to the extent of the width of the parallel light rays. That is, the invention can provide easily the wavelength measuring system having a wide dynamic wavelength range.

A wavelength measuring system according to a second aspect of the invention is the wavelength measuring system according to the first aspect of the invention, further comprising second splitting means for splitting the parallel light rays propagating from the side of the light input part to the first splitting means at a predetermined ratio, the signal processing means outputting a signal for determining the wavelength of the incoming light beam on the basis of results of comparison in optical power among the first split light beam, the second split light beam, and a third split beam as split by the second splitting means.

With the wavelength measuring system according to the second aspect of the invention, in case of a change in optical power of the incoming light beam, correction to cope with such a change in the optical power can be achieved by comparative processing with the use of the optical power of the third split beam. There is no limitation to a location where the third split beam is split, and the parallel light rays propagating from the side of the light input part to the first splitting means may be split at any place along an optical path thereof.

A wavelength measuring system according to a third aspect of the invention is the wavelength measuring system according to the first or second aspect of the invention, wherein the spectroscopic means is made up of a first diffraction grating for receiving the parallel light rays from the optics and dispersing same by the wavelength, and a second diffraction grating for receiving dispersed light rays from the first diffraction grating and dispersing same again by the wavelength. Both the first diffraction grating and the second diffraction grating may be of either reflection type or transmission type. Further, any spectroscopic means made up of the first diffraction grating and the second diffraction grating, having an identical optical characteristic, and disposed symmetrically against and in parallel with each other, may function as the spectroscopic means described above.

A wavelength measuring system according to a fourth aspect of the invention is the wavelength measuring system according to the first or second aspect of the invention, wherein the spectroscopic means is made up of a first prism for receiving the parallel light rays from the optics and dispersing same by the wavelength, and a second prism for receiving transmitted light rays from the first prism and dispersing same again by the wavelength.

A wavelength measuring system according to a fifth aspect of the invention is the wavelength measuring system according to the second aspect of the invention, wherein the spectroscopic means is made up of the first diffraction grating for receiving the parallel light rays from the optics and dispersing same by the wavelength, and the second diffraction grating for receiving dispersed light rays from the first diffraction grating and dispersing same again by the wavelength, the first diffraction grating functioning as the second splitting means as well, and light rays of the zero order of diffraction, reflected from the first diffraction grating, with the wavelength thereof unselected, being used as the third split light beam.

With the wavelength measuring system according to the fifth aspect of the invention, the spectroscopic means serves as the second splitting means, and to that extent, the number of optical components is reduced, leading to reduction in cost, simplification in assembling work, and miniaturization in the construction of the wavelength measuring system. Further, since the light beam of the zero order of diffraction from the first diffraction grating (reflected light beam of the zero order of diffraction) is utilized as the third split light beam, an increase of loss in quantity of the incoming light beam for measurement as with the case of a portion thereof being taken out as the third split light beam is avoided.

A wavelength measuring system according to a sixth aspect of the invention is the wavelength measuring system according to the second aspect of the invention, wherein the spectroscopic means is made up of a first prism for receiving the parallel light rays from the optics and dispersing same by the wavelength, and a second prism for receiving transmitted light rays from the first prism and dispersing same again by the wavelength, the first prism functioning as the second splitting means as well, and a light beam reflected from a surface of the first prism on which the parallel light rays falls being used as the third split light beam.

With the wavelength measuring system according to the sixth aspect of the invention, the spectroscopic means serves as the second splitting means as well, and to that extent, the number of optical components is reduced, leading to reduction in cost, simplification in assembling work, and miniaturization in the construction of the wavelength measuring system. Further, since the light beam reflected from the first prism is utilized as the third split light beam, an increase of loss in quantity of the incoming light beam for measurement due to a portion thereof taken out as the third split light beam is avoided.

A wavelength measuring system according to a seventh aspect of the invention is the wavelength measuring system according to any one of the first to sixth aspects of the invention, further comprising depolarizing means for reducing variation in polarization of the incoming light beam from the light input part.

With the wavelength measuring system according to the seventh aspect of the invention, variation in polarization of the incoming light beam can be reduced by the agency of the depolarizing means even with the use of the spectroscopic means having significant polarization characteristic (for example, in case of using wavelength dispersion elements, that is, diffraction gratings, having considerable polarization characteristic), enabling degradation in dispersion (reflection) efficiency of the spectroscopic means owing to the polarization characteristic thereof to be prevented. Consequently, a decline in the intensity of the first split light beam and the second split light beam, owing to the polarization characteristic of the incoming light beam, is avoided so that comparison of the intensity of the first split light beam with that of the second split light beam can be accurately executed by the signal processing means. Further, in the case where the third split light beam is used in measuring wavelengths, a ratio of decline in the intensity of the third split light beam owing to the polarization characteristic of the incoming light beam generally differs from that for the first split light beam and the second split light beam. As a result, if the polarization characteristic is significant in magnitude, comparison of the intensity of the third split light beam with that for the first split light beam and the second split light beam will become inaccurate. With the wavelength measuring system according to the seventh aspect of the invention, however, comparison of the intensity of the third split light beam with that for the first split light beam and the second split light beam can be executed accurately by reducing the effect of the polarization characteristic.

DESCRIPTION OF THE PREFERRED EMBODIMENTS

Embodiments of a wavelength measuring system according to the invention are described in detail hereinafter with reference to FIGS. 1 to 8.

Figure 1:
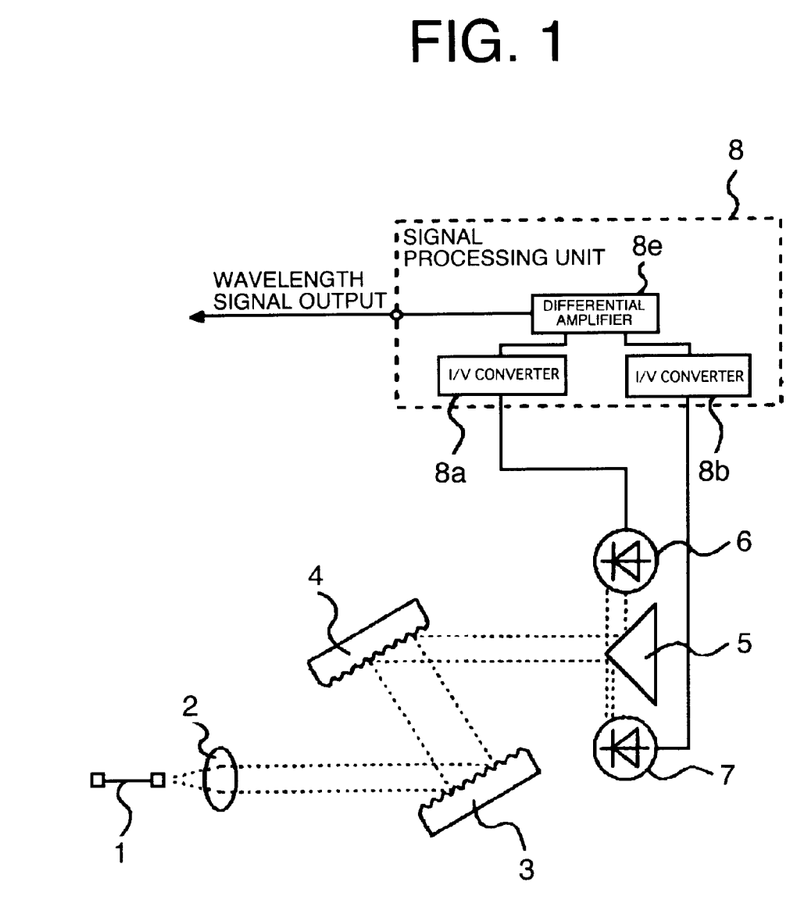
FIG. 1 is a block diagram showing a wavelength measuring system according to a first embodiment of the invention.

FIG. 1 is a block diagram showing a wavelength measuring system according to a first embodiment of the invention.

As shown in FIG. 1, the wavelength measuring system according to the first embodiment comprises an input optical fiber 1 as an input part, a lens 2 as optics for converting a light beam into parallel light rays, first and second diffraction gratings 3, 4 as wavelength dispersion elements making up spectroscopic means, a right-angle reflecting prism 5 as first splitting means, first and second optical receivers 6, 7 fixedly attached onto an optical bench (not shown), and a signal processing unit (signal processing means) 8 for processing output signals from the first and second optical receivers 6, 7.

An input light beam from a light source (not shown in FIG. 1) is guided into the input optical fiber 1, and sent out from an edge face thereof.

The lens 2 is disposed on the optical axis of the light beam outgoing from the input optical fiber 1, and turns the outgoing light beam from the edge face of the input optical fiber 1 into parallel light rays.

The outgoing light beam, after being converted into the parallel light rays, falls on the first diffraction grating 3 disposed on the optical axis of the outgoing light beam.

The first diffraction grating 3, functioning as a wavelength dispersion reflector, causes the parallel light rays incident thereon at the angle of incidence q as expressed by the equation (1) described in the foregoing to be reflected toward the second diffraction gratings 4 at the angle of reflection b, as determined by respective wavelengths of the parallel light rays.

The second diffraction grating 4 reflects again light rays reflected from the first diffraction grating 3 (for example, a reflected light ray of the primary order of diffraction) toward the right-angle reflecting prism 5 at the angle of reflection found by the equation (1).

The first diffraction grating 3 and the second diffraction grating 4 are diffraction gratings having the same optical performance, and disposed in parallel with and opposite to each other. Accordingly, the angle of incidence of the light ray falling on the second diffraction grating 4 is equal to the angle of reflection of the light ray reflected from the first diffraction grating 3, and the angle of reflection of the light ray reflected from the second diffraction grating 4 is equal to the angle of incidence of one of the parallel light rays incident on the first diffraction grating 3.

As a result, the optical axis of the light ray reflected from the second diffraction grating 4 will be in parallel with the optical axis of the outgoing light beam from the input optical fiber 1, undergoing translation movement in such a way as to change a distance between the optical axis of the outgoing light beam from the input optical fiber 1 and the optical axis of the light ray reflected from the second diffraction grating 4 according to the wavelength of the outgoing light beam from the input optical fiber 1.

The right-angle reflecting prism 5 divides the parallel light rays reflected from the second diffraction grating 4 into two portions along a dividing line formed by two sides thereof, intersecting each other at a right angle, such that each of the two portions falls on the first and second optical receivers 6, 7, respectively. One portion of the parallel light rays, split on the side of the first optical receiver 6, is a first split light beam, and the other portion of the parallel light rays, split on the side of the second optical receiver 7, is a second split light beam.

The first and second optical receivers 6, 7 are made up of, for example, a photodiode, and the like, and convert the light rays, reflected from the second diffraction grating 4 and split by the right-angle reflecting prism 5, into electric signals, outputting electric current, respectively, corresponding to optical power of the light rays reflected as described above.

The signal processing unit 8 is made up of I/V converters 8a, 8b for converting electric current proportional to the intensity of the respective split light beams, that is, electric signals from the first and second optical receivers 6, 7, respectively, and a differential amplifier 8e for comparing strengths of signals from the first and second optical receivers 6, 7, respectively, with each other, and amplifying a difference, outputting an amplified difference in voltage as a wavelength signal for determining the wavelength of the incoming light beam.

Figure 2:
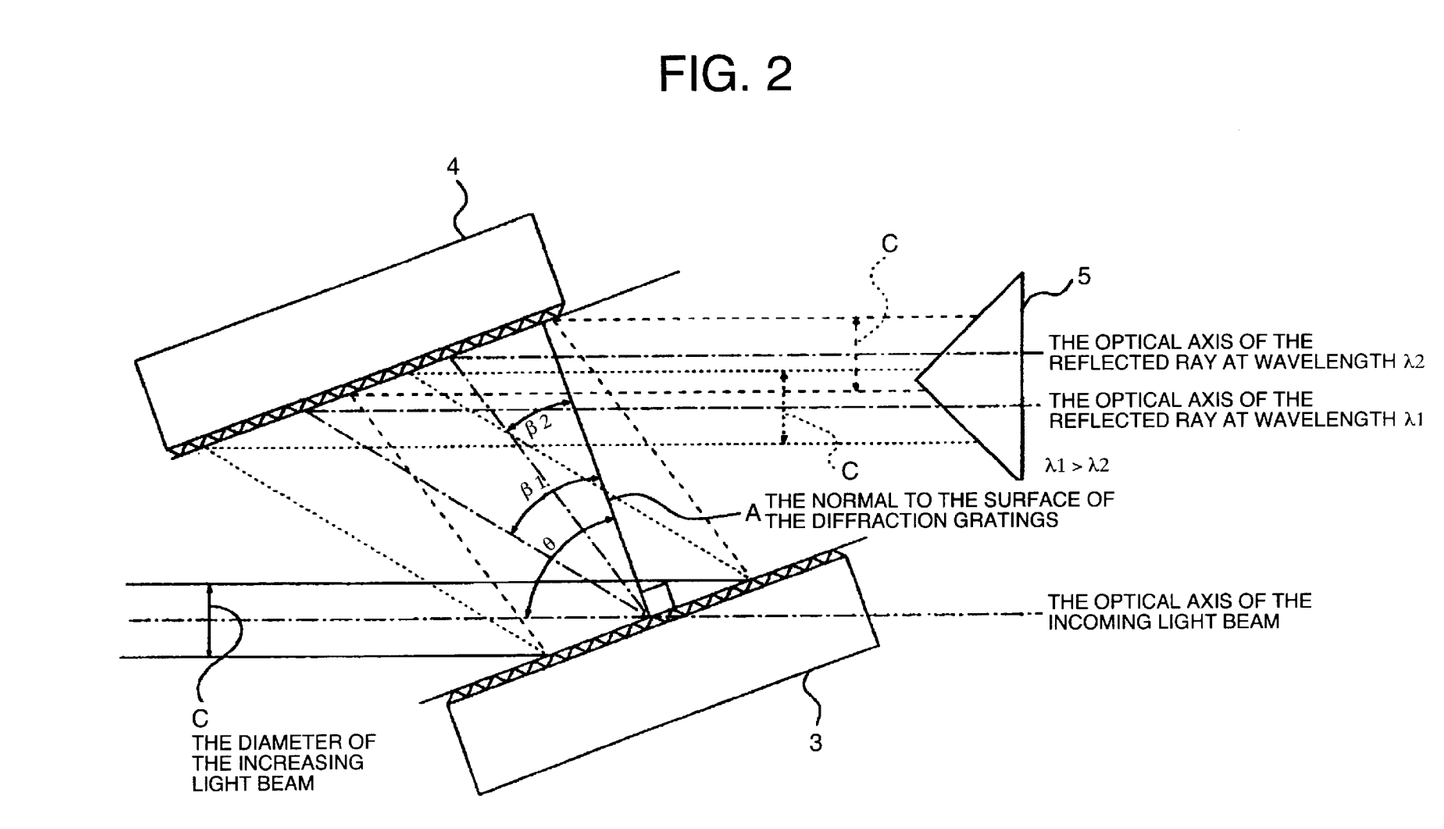
FIG. 2 is a schematic representation illustrating displacement of reflected parallel light rays incident on a right-angle prism, varying according to a wavelength of an incoming light beam.

FIG. 2 is a schematic representation illustrating displacement of the optical axis of reflected parallel light rays, incident on the right-angle reflecting prism 5, according to the wavelength of the incoming light beam. In the figure, A denotes the normal to the surface of the first diffraction grating 3 and the second diffraction grating 4, respectively, and C denotes the diameter of the incoming light beam.

The incoming light beam in the form of the parallel light rays falls on the first diffraction grating 3 at the angle of incidence q, and is reflected at given angles of reflection (for example, at the angle of incidence b1 if a wavelength is l1, and at the angle of incidence b2 if a wavelength is l2) depending on wavelengths of the respective parallel light rays. Reflected light rays fall on the second diffraction grating 4 at the angle of incidence according to the wavelength thereof, and are reflected at the angle q, regardless of wavelengths thereof. Accordingly, the reflected light rays from the second diffraction grating 4 are substantially in parallel with the incoming light beam, and the diameter of a light beam composed of the reflected light rays is substantially the same as that of the incoming light beam. With the configuration shown in FIG. 2, a light ray reflected from the second diffraction grating 4, having the optical axis closer to that of the incoming light beam, outgoing from the lens 2, will be on the side of longer wavelengths while same having the optical axis further away from that of the incoming light beam will be on the side of shorter wavelengths.

Figure 3:
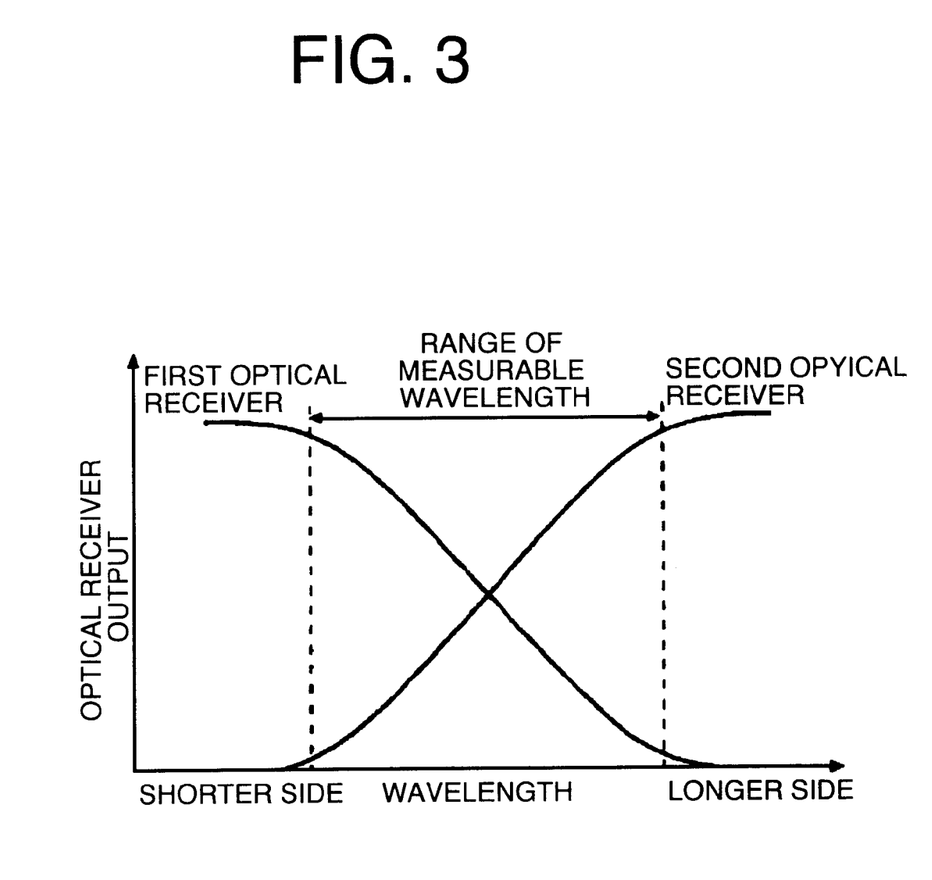
FIG. 3 shows a graph indicating output characteristic of first and second optical receivers, respectively, in relation to a wavelength of the incoming light beam.

FIG. 3 shows a graph indicating output characteristics of the first and second optical receivers 6, 7, respectively, in relation to the wavelength of the incoming light beam.

As shown in FIG. 2, spots where the light rays reflected from the first diffraction grating 3, and the second diffraction grating 4 strike the right, angle reflecting prism 5 varies depending on the wavelength thereof and as a result, a proportion of light beams divided on two sides by the right-angle reflecting prism 5 also varies depending on the wavelength. Consequently, following such variation in the proportion of the light beams divided, the intensity of respective split light beams inputted to the first and second optical receivers 6, 7, respectively, varies as shown in FIG. 3. Thus, the wavelength of an incoming light beam can be determined from a ratio of the intensity between the split light beams, divided and inputted to the first optical receivers 6 and the second optical receivers 7, respectively.

With the wavelength measuring system according to the first embodiment of the invention, it is necessary in making measurement of the wavelength of a light wave that light falls on both the first optical receiver 6 and the second optical receiver 7, which in turn deliver output, respectively. Accordingly, a range for measurable wavelengths is defined by a range of wavelengths of light rays that can fall on both the first optical receiver 6 and the second optical receiver 7.

It follows that the range for measurable wavelength can be expanded by enlarging the diameter of an incoming light beam even if the configuration of the first diffraction grating 3, and the second diffraction grating 4 remains constant, and conversely, the range for measurable wavelength is narrowed down by reducing the diameter of the incoming light beam. That is, the range for measurable wavelength can be expanded with relative ease.

It is further possible to adjust the range for measurable wavelengths and a measurement resolution power by varying a distance between two wavelength dispersion elements (diffraction gratings, and prisms: the first and second diffraction gratings 3, and 4, in this embodiment), disposed opposite to each other, the diameter of the incoming light beam to be turned into the parallel light rays, and an inclination angle at which the two wavelength dispersion elements are disposed. That is, by use of identical optical components, and by varying the configuration thereof, the wavelength measuring system having various characteristics of wavelength measurement (a varying range for measurable wavelengths and a varying measurement resolution power) can be manufactured. In other words, even in the case of manufacturing wavelength measuring systems having various wavelength measurement characteristics (a varying range for measurable wavelengths and a varying measurement resolution power), it is unnecessary to provide for optical elements having various characteristics, resulting in reduction of cost.

With the wavelength measuring system according to the first embodiment of the invention, since mechanically movable parts are not required in measuring wavelengths as described in the foregoing, it is possible to enhance reliability over the long term, to achieve miniaturization in the configuration thereof, and to shorten time required for measuring wavelengths (capability of determining the wavelength of the incoming light beam for measurement, substantially upon arrival thereof). Further, the signal processing unit 8 for outputting wavelength signals for determining the wavelength can be made up of a simple circuit comprising mainly the I/V converters 8a, 8b for converting electric signals from the first and second optical receivers 6, 7, respectively, that is, electric current proportional to the intensity of the respective split light beams, and the differential amplifier 8e for comparing output voltages from the first and second optical receivers 6, 7, respectively, with each other, not requiring a piece of software in determining a wavelength. Further, as described hereinbefore, the range for measurable wavelengths can be expanded with ease.

Furthermore, with the wavelength measuring system according to this embodiment, it is feasible to miniaturize the construction thereof, particularly, an optical system made up of the lens 2, the spectroscopic means 3, 4, the right-angle reflecting prism 5, and so forth, and consequently, degradation in accuracy of wavelength measurement can be avoided with ease by controlling the temperature of the optical system in whole even if the condition of an application environment undergoes a significant change.

It is further to be pointed out that the invention is not limited to the wavelength measuring system of the construction according to this embodiment., and for example, transmission type diffraction gratings, dispersion prisms, and so forth may be substituted for the wavelength dispersion elements making up the spectroscopic means. Further, in place of the configuration wherein the parallel light rays is split with the use of the right-angle reflecting prism as the first splitting means, various other configurations wherein, for example, the parallel light rays is split with the use of a surface reflective prism (mirror), and the like may be adopted. Also, it goes without saying that in place of the configuration wherein the parallel light rays after divided fall directly on the first and second optical receivers 6, 7, the parallel light rays may be condensed by use of condensing means before being received by the optical receivers.

Figure 4:
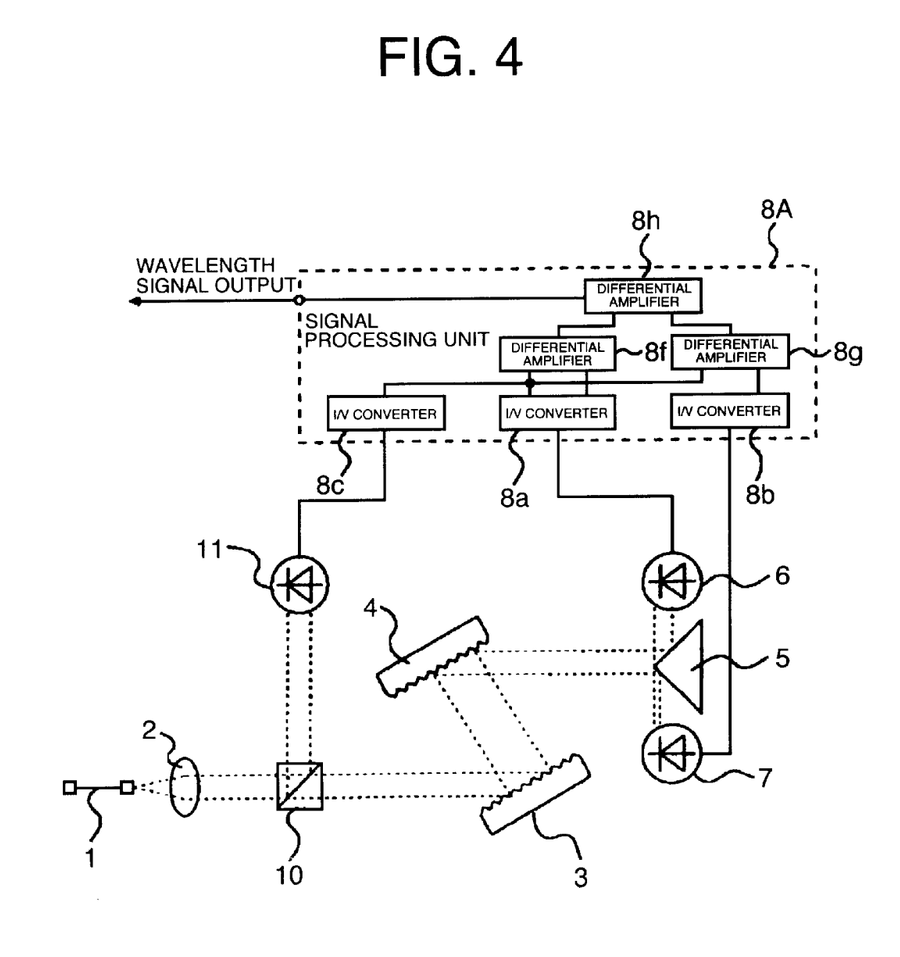
FIG. 4 is a block diagram showing a wavelength measuring system according to a second embodiment of the invention.

FIG. 4 is a block diagram showing a wavelength measuring system according to a second embodiment of the invention. In the second embodiment, parts similar to those previously described with reference to the first embodiment are denoted by identical reference numerals, and description thereof is omitted.

The wavelength measuring system according to the second embodiment is made up by adding an optical splitter 10 as second splitting means and a third optical receiver 11 to the wavelength measuring system according to the first embodiment of the invention while modifying the signal processing unit 8 of the first embodiment to a signal processing unit 8A for processing electric signals from the third optical receiver 11 as well.

The optical splitter 10 is disposed between a lens 2 as optics for turning an incoming light beam into parallel light rays and a first diffraction grating 3, splitting the parallel light rays falling thereon at a given ratio, and reflecting a portion of the parallel light rays toward the third optical receiver 11 while transmitting the rest of the parallel light rays to the first diffraction grating 3. The portion of the parallel light rays, reflected toward the third optical receiver 11 makes up a third split light beam. The parallel light rays falling on the first diffraction grating 3 behave in the same way as in the case of the first embodiment.

The third optical receiver 11 is made up of, for example, a photodiode, and so forth, and converts the third split light beam, split and reflected by the optical splitter 10, into an electric signal.

The signal processing unit 8A carries out comparison between signals from the first, second, and third optical receivers, 6, 7, 11, and amplification of differences therebetween, outputting a wavelength signal for determining the wavelength of an incoming light beam.

The signal processing unit 8A is made up of a simple circuit comprising mainly I/V converters 8a, 8b, 8c for converting the electric signal from the first, second, and third optical receivers 6, 7, 11, respectively, that is, electric current proportional to the intensity of respective split light beams into voltage, differential amplifiers 8f, 8g for comparing the strength of the signal from the first and second optical receivers 6, 7, respectively, on the basis of the signal from the third optical receiver 11 as reference strength, and amplifying differences, and another differential amplifier 8h for comparing signals from the differential amplifiers 8f, and 8g, with each other, and amplifying a difference therebetween.

With the wavelength measuring system according to the first embodiment, if the intensity of an incoming light beam from the input optical fiber 1 (for example, an incoming light beam from a light source) varies, a ratio of the intensity of the split light beam received by the first optical receiver 6 to that of the split light beam received by the second optical receiver 7, dependent on the wavelength of the respective split light beams, remains unchanged, however, the strength of signals themselves undergoes changes. It is therefore impossible to control wavelengths at the light source of the incoming light beam with a signal itself outputted from the signal processing unit 8 although the wavelength of the incoming light beam can be measured.

On the other hand, with the wavelength measuring system according to the second embodiment, even if the intensity of the incoming light beam changes, the intensity of the split light beam received by the first and second optical receivers 6, 7, respectively, is standardized on the basis of the intensity of the incoming light beam as reference intensity before comparing the signals from the first and second optical receivers 6, 7, dependent on the wavelength, and amplifying a difference. With such a configuration, a wavelength signal finally outputted from the signal processing unit 8A for determining the wavelength is determined directly and exclusively on the basis of the wavelength only, without being changed, even if the intensity of the incoming light beam undergoes a change.

As a result, with the use of the wavelength measuring system according to the second embodiment, it is possible not only to measure the wavelength of the incoming light beam at the light source, but also to control the wavelength at the light source with the signal itself outputted by the signal processing unit 8A.

It is also to be pointed out that the invention is not limited to the wavelength measuring system of the configuration according to this embodiment, wherein the optical splitter shown as the second splitting means is disposed between the lens 2 and the first diffraction grating 3, but, for example, the optical splitter 10 may be disposed between the spectroscopic means and the right-angle reflecting prism 5, or between the first diffraction grating 3 and the second diffraction grating 4 within the spectroscopic means.

Figure 5:
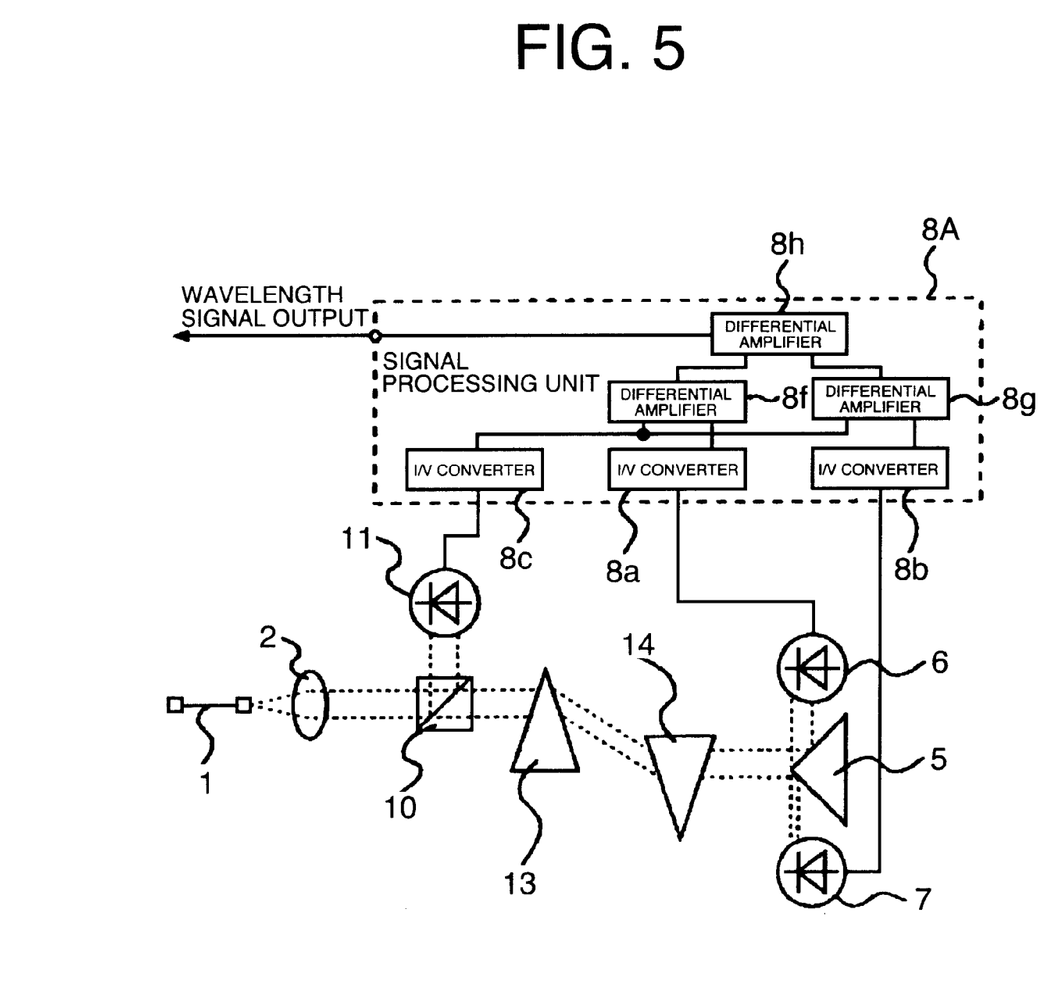
FIG. 5 is a block diagram showing a wavelength measuring system according to a third embodiment of the invention.

FIG. 5 is a block diagram showing a wavelength measuring system according to a third embodiment of the invention. In the third embodiment, parts similar to those previously described with reference to the wavelength measuring system according to the first and second embodiments are denoted by identical reference numerals, and description thereof is omitted.

The wavelength measuring system according to the third embodiment of the invention differs from the wavelength measuring system according to the second embodiment only in respect of use of dispersion prisms as wavelength dispersion elements of spectroscopic means, and otherwise, has the same configuration as that of the wavelength measuring system according to the second embodiment.

A first dispersion prism 13 is disposed at a fixed position on the optical axis of an outgoing light beam from a lens 2, and causes the outgoing light beam to be dispersively transmitted therethrough at various angles, depending on wavelengths of light rays.

A second dispersion prism 14 is disposed in a symmetrical fashion against the first dispersion prism 13, and at a fixed position on the optical axis of transmitted light rays from the first dispersion prism 13, and upon receiving the transmitted light rays from the first dispersion prism 13, causes the transmitted light rays to be dispersively transmitted therethrough in the direction of a right-angle reflecting prism 5.

With the wavelength measuring system according to the third embodiment, the same effect of operation as those for the first and second embodiments are attained.

Figure 6:
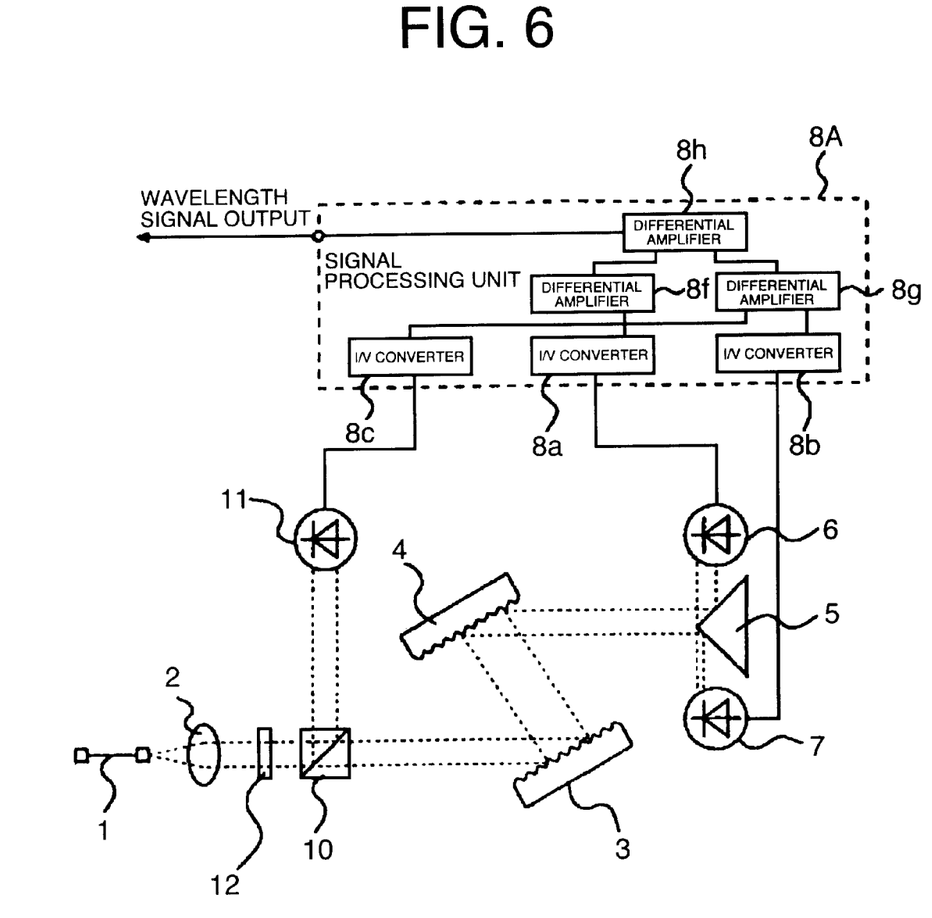
FIG. 6 is a block diagram showing a wavelength measuring system according to a fourth embodiment of the invention.

FIG. 6 is a block diagram showing a wavelength measuring system according to a fourth embodiment of the invention. In the fourth embodiment, parts similar to those previously described with reference to the wavelength measuring system according to the first through the third embodiments are denoted by identical reference numerals, and description thereof is omitted.

The wavelength measuring system according to the fourth embodiment of the invention has the same construction as that for the wavelength measuring system according to the second embodiment except that a depolarizing optical element (depolarizing means) 12 is disposed between a lens 2 and an optical splitter 10.

Figure 7:
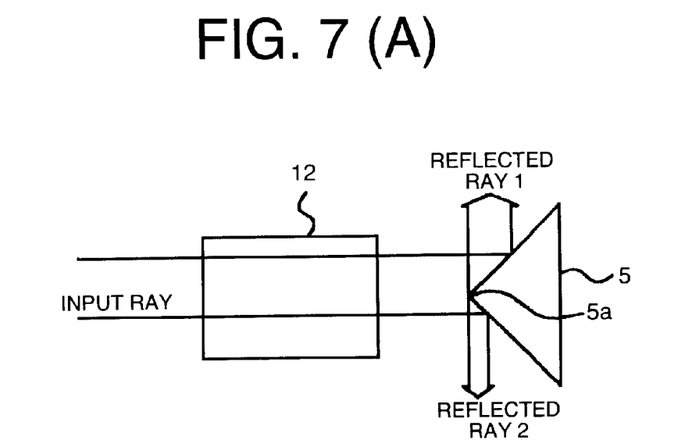
FIGS. 7(A), 7(B), and 7(C) are schematic representations representation illustrating adjustment of the direction in which the incoming light beam is separated by use of a beam displacer employing calcite as a depolarizing optical element.

FIGS. 7(A)–7(C) show three different views for illustrating conditions of separation of transmitted light by the agency of the depolarizing optical element 12. In the figure, the optical splitter 10 and spectroscopic means (first and second diffraction gratings 3, 4) are omitted.

A beam displacer, and the like, employing, for example, a crystal depolarizing plate or calcite, may be used as the depolarizing optical element 12, and by the agency of such a beam displacer, incoming light is separated into two linearly polarized collimating light beams, with polarization planes thereof orthogonally intersecting each other. As shown in FIGS. 7(A)–7(C), the direction in which the incoming light is separated into the collimating light beams is adjusted such that the direction of the respective collimating light beams separated intersects the direction along which incoming light is divided into two portions by a right-angle reflecting prism 5 towards first and second optical receivers, respectively, at right angles (so as to be in parallel with a dividing line 5a of the right-angle reflecting prism 5).

With the wavelength measuring system according to this embodiment, using the depolarizing optical element 12, variation in polarization of the incoming light can be reduced by the agency of the depolarizing optical element 12 even with the use of wavelength dispersion elements, that is, diffraction gratings, having considerable polarization characteristic as spectroscopic means, enabling degradation in dispersion (reflection) efficiency due to the effect of the polarization characteristic of the wavelength dispersion elements to be prevented so that a resultant decline in the intensity of the collimating light beam falling on the first and second optical receivers 6, 7, respectively, can be avoided.

Figure 8:
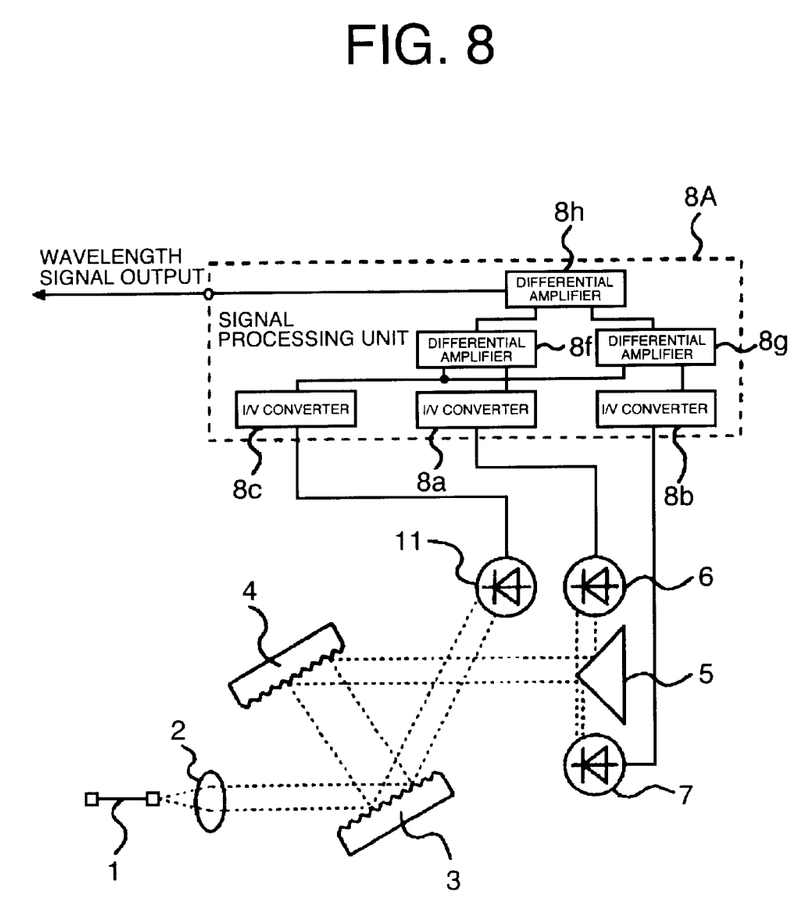
FIG. 8 is a block diagram showing a wavelength measuring system according to a fifth embodiment of the invention.

FIG. 8 is a block diagram showing a wavelength measuring system according to a fifth embodiment of the invention. In the fifth embodiment, parts similar to those previously described with reference to the wavelength measuring system according to the first through the fourth embodiments are denoted by identical reference numerals, and description thereof is omitted.

The wavelength measuring system according to the fifth embodiment of the invention, using first and second diffraction gratings 3, 4 as wavelength dispersion elements of spectroscopic means, is made up such that the first grating 3 is caused to function as a second splitting means as well, reflecting a portion of parallel light rays falling on the first grating 3, that is, a light beam of the zero order of diffraction at a wavelength not selected as a third split light beam, and a third optical receiver 11 is disposed so as to receive the third split light beam. With the wavelength measuring system according to the fifth embodiment, the optical splitter 10 employed in the second embodiment can be dispensed with, and consequently, the number of optical components can be reduced, resulting in cost reduction and simplification of assembling work. Furthermore, since there is no need of splitting the parallel light rays with the optical splitter, loss in optical power is reduced to that extent.

Figure 9:
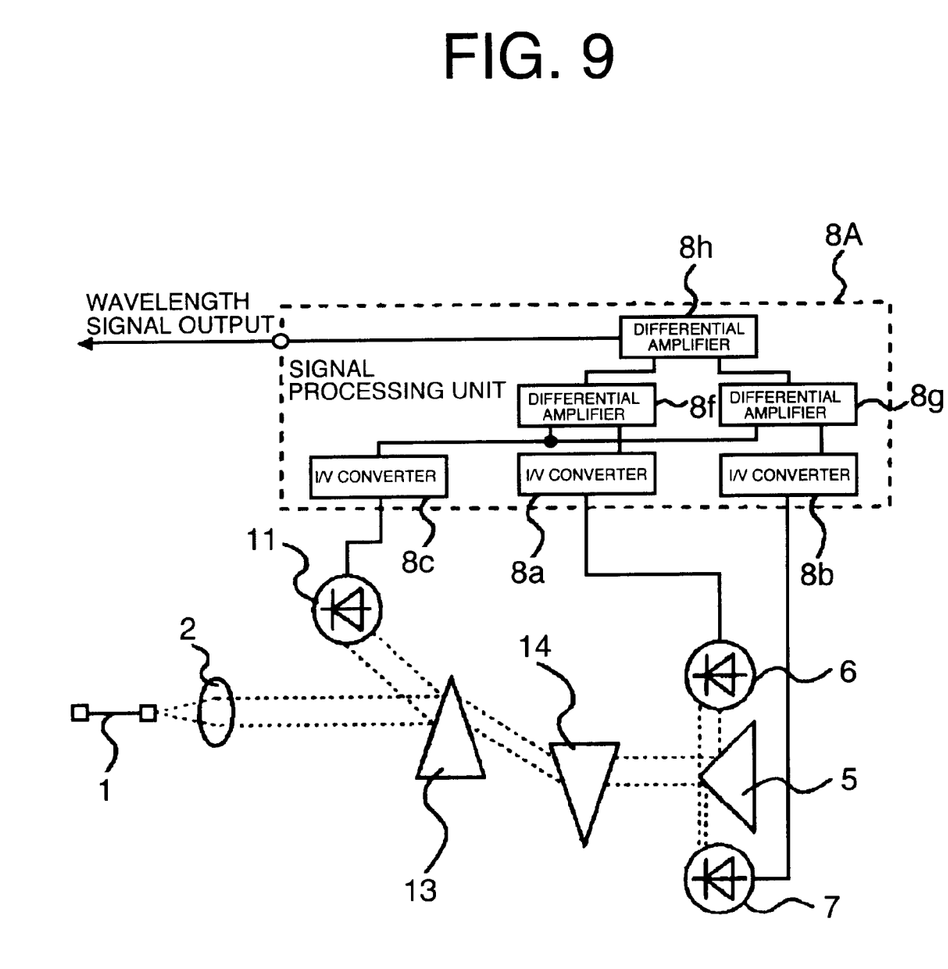
FIG. 9 is a block diagram showing a wavelength measuring system according to a sixth embodiment of the invention.

FIG. 9 is a block diagram showing a wavelength measuring system according to a sixth embodiment of the invention. In the sixth embodiment, parts similar to those previously described with reference to the wavelength measuring system according to the first through the fifth embodiments are denoted by identical reference numerals, and description thereof is omitted.

The wavelength measuring system according to the sixth embodiment of the invention, using first and second dispersion prisms 13, 14 as wavelength dispersion elements of spectroscopic means, is made up such that the first dispersion prism 13 is caused to function as second splitting means as well, reflecting therefrom a portion of parallel light rays falling on the first dispersion prism 13 as a third split light beam and a third optical receiver 11 is disposed so as to receive the third split light beam.

With the wavelength measuring system according to this embodiment, the optical splitter 10 employed in the second embodiment can be dispensed with, and consequently, the number of optical components can be reduced, resulting in cost reduction and simplification of assembling work. Furthermore, since there is no need of splitting the parallel light rays with the optical splitter, loss in optical power is reduced to that extent.

Thus, the invention can provide a highly reliable wavelength measuring system which has no movable mechanical component, and consequently, is not susceptible to degradation in performance over time. Further, since there is no need of using expensive components such as a PD array, reduction in cost is feasible. Furthermore, with the wavelength measuring system according to the invention, use of a software is not required in data processing for determining light wavelengths, enabling high speed measurement of light wavelengths, and the wavelength measuring system according to the invention is quite useful particularly, when used in controlling wavelengths at a light source, because rapid control by processing with a hardware is possible.

What is claimed is:

1. A wavelength measuring system comprising:
   optics for converting an incoming light beam from a light input part into parallel light rays;
   spectroscopic means for receiving the parallel light rays from the optics traveling in a first direction, and causing the parallel light rays to undergo parallel displacement in a second direction according to wavelengths of the parallel light rays;
   first splitting means for splitting the parallel light rays received from the spectroscopic means into two portions along a predetermined dividing line to form a first split light beam and a second split light beam; and
   signal processing means for outputting a signal for determining the wavelength of the incoming light beam on the basis of a comparison in optical power between the first split light beam and the second split light beam, as divided by the first splitting means.

2. The wavelength measuring system according to claim 1, further comprising second splitting means for splitting the parallel light rays propagating from the light input part to the first splitting means at a predetermined ratio, the signal processing means outputting a signal for determining the wavelength of the incoming light beam on the basis of results of comparison in optical power among the first split light beam, the second split light beam, and a third split light beam as split by the second splitting means.

3. The wavelength measuring system according to claim 2, wherein the spectroscopic means comprises a first diffraction grating for receiving the parallel light rays from the optics and dispersing the parallel light rays by the wavelength, and a second diffraction grating for receiving dispersed light rays from the first diffraction grating and dispersing the light rays again by the wavelength, the first and second diffraction gratings, in combination, causing the light rays to undergo parallel displacement.

4. The wavelength measuring system according to claim 2, wherein the spectroscopic means comprises a first prism for receiving the parallel light rays from the optics and dispersing the parallel light rays by the wavelength, and a second prism for receiving transmitted light rays from the first prism and dispersing the light rays again by the wavelength.

5. The wavelength measuring system according to claim 2, wherein the spectroscopic means comprises a first diffraction grating for receiving the parallel light rays from the optics and dispersing the parallel light rays by the wavelength, and a second diffraction grating for receiving dispersed light rays from the first diffraction grating and dispersing the light rays again by the wavelength, the first diffraction grating also functioning as the second splitting means, wherein light rays of a zero order of diffraction, reflected from the first diffraction grating, comprise the third split light beam.

6. The wavelength measuring system according to claim 2, wherein the spectroscopic means is made up of a first prism for receiving the parallel light rays from the optics and dispersing the parallel light rays by the wavelength, and a second prism for receiving transmitted light rays from the first prism and dispersing the light rays again by the wavelength, the first prism also functioning as the second splitting means, and the third split light beam is reflected from a surface of the first prism on which the parallel light rays fall.

7. The wavelength measuring system according to claim 2,
   wherein the wavelength measuring system further comprises depolarizing means for reducing variation in polarization of the incoming light beam from the light input part.

8. The wavelength measuring system according to claim 1, wherein the spectroscopic means comprises of a first diffraction grating for receiving the parallel light rays from the optics and dispersing the parallel light rays by the wavelength, and a second diffraction grating for receiving dispersed light rays from the first diffraction grating and dispersing the light rays again by the wavelength.

9. The wavelength measuring system according to claim 1, wherein the spectroscopic means comprises of a first prism for receiving the parallel light rays from the optics and dispersing the parallel light rays by the wavelength, and a second prism for receiving transmitted light rays from the first prism and dispersing the light rays again by the wavelength.

10. The wavelength measuring system according to claim 1, wherein the wavelength measuring system further comprises depolarizing means for reducing variation in polarization of the incoming light beam from the light input part.

11. A wavelength measuring system comprising: optics for converting an incoming light beam from a light input part into parallel light rays;

spectroscopic means for receiving the parallel light rays from the optics and causing the parallel light rays to undergo parallel displacement according to wavelengths of the parallel light rays;

first splitting means for splitting the parallel light rays received from the spectroscopic means into a first split light beam and a second split light beam spaced from the first light beam;

first and second spaced optical sensors for receiving the respective first and second split light beams, said optical sensors converting the split light beams into first and second electrical signals; and signal processing means for outputting a wavelength signal for determining the wavelength of the incoming light beam by comparing the first and second electrical signals.

12. The wavelength measuring system of claim 11, wherein the spectroscopic means comprises:

a first diffraction grating for receiving the parallel light rays and dispersing the parallel light rays by the wavelength; and a second diffraction grating for receiving the dispersed rays from the first diffraction grating and dispersing the received rays by the wavelength toward the first splitting means, the second diffraction grating having an identical optical characteristic as the first diffraction grating and disposed symmetrically in parallel with the first diffraction grating so that the parallel light rays undergo parallel displacement from the first and second diffraction gratings.

13. The wavelength measuring system of claim 11, wherein the first and second optical receivers each comprise a single photodiode.

14. The wavelength measuring system of claim 11, wherein the first splitting means comprises a reflecting prism reflecting the first and second split light beams in different directions, and the first and second optical sensors are aligned and spaced from each other to receive the respective first and second split beams.

15. The wavelength measuring system of claim 14, wherein the different directions of the first and second split beams are opposing directions.

16. The wavelength measuring system of claim 11, wherein the optics comprises a lens.

17. A wavelength measuring system comprising:

optics for converting an incoming light beam from a light input part into parallel light rays;

spectroscopic means for receiving the parallel light rays from the optics and causing the parallel light rays to undergo parallel displacement according to wavelengths of the parallel light rays;

first splitting means for splitting the parallel light rays received from the spectroscopic means into a first split light beam and a second split light beam;

first and second spaced optical sensors for receiving the respective first and second split light beams, said first and second optical sensors converting the first and second split light beams into first and second electrical signals;

second splitting means for splitting the parallel light rays propagating from the light input part toward the first splitting means to form a third split beam traveling in a direction different than the directions of the first and second split light beams;

a third optical receiver for converting the third split beam into a third electrical signal; and signal processing means for outputting a signal corresponding to the wavelength of the incoming light beam by comparison of the first, second and third electrical signals.

18. The wavelength measuring system of claim 17, wherein the spectroscopic means comprises:

a first diffraction grating for receiving the parallel light rays and dispersing the parallel light rays by the wavelength;

a second diffraction grating for receiving the dispersed rays from the first diffraction grating and dispersing the received rays by the wavelength and toward the first splitting means, the second diffraction grating having an identical optical characteristic as the first diffraction grating and disposed symmetrically in parallel with the first diffraction grating so that the parallel light rays undergo parallel displacement from the first and second diffraction gratings.

19. The wavelength measuring system of claim 18, wherein the first diffraction grating also functions as the second optical splitter by sending a portion of the parallel light rays toward the third optical receiver as the third split beam.

20. The wavelength measuring system of claim 17 wherein the spectroscopic means comprises:

a first prism for receiving the parallel light rays and dispersing the parallel light rays by the wavelength; and a second prism for receiving dispersed rays passed through the first prism and dispersing the received rays by the wavelength and toward the first splitting means, the first prism functioning as the second splitting means by reflecting light rays to the third optical receiver.

* * * * *